(12) United States Patent
Huffington et al.

(10) Patent No.: US 9,687,860 B2
(45) Date of Patent: Jun. 27, 2017

(54) QUICK CONNECT SHOWERHEAD

(71) Applicant: Delta Faucet Company, Indianapolis, IN (US)

(72) Inventors: Todd A. Huffington, Avon, IN (US); Patrick B. Jonte, Zionsville, IN (US)

(73) Assignee: Delta Faucet Company, Indianapolis, IN (US)

( * ) Notice: Subject to any disclaimer, the term of this patent is extended or adjusted under 35 U.S.C. 154(b) by 134 days.

(21) Appl. No.: 14/829,300

(22) Filed: Aug. 18, 2015

(65) Prior Publication Data
US 2017/0050197 A1 Feb. 23, 2017

(51) Int. Cl.
| | |
|---|---|
| *B05B 1/00* | (2006.01) |
| *B05B 1/18* | (2006.01) |
| *B05B 15/06* | (2006.01) |
| *B05B 9/01* | (2006.01) |
| *F16L 37/248* | (2006.01) |
| *F16L 37/252* | (2006.01) |
| *B05B 1/14* | (2006.01) |
| *B05B 3/04* | (2006.01) |

(52) U.S. Cl.
CPC .............. *B05B 1/185* (2013.01); *B05B 1/14* (2013.01); *B05B 3/04* (2013.01); *B05B 9/01* (2013.01); *B05B 15/065* (2013.01); *B05B 15/066* (2013.01); *B05B 15/067* (2013.01); *F16L 37/248* (2013.01); *F16L 37/252* (2013.01)

(58) Field of Classification Search
CPC ......... B05B 1/185; B05B 15/065; B05B 3/04; B05B 9/01; B05B 1/14; B05B 15/066; B05B 15/067; F16L 37/252; F16L 37/248

USPC ...... 239/548, 525, 587.1, 587.3, 587.4, 600, 239/380–383; 285/33, 146.1, 148.2, 305
See application file for complete search history.

(56) References Cited

U.S. PATENT DOCUMENTS

| | | | |
|---|---|---|---|
| 2,776,168 A | * | 1/1957 | Schweda ................. E03C 1/06 285/146.1 |
| 4,722,560 A | | 2/1988 | Guest |
| 5,177,870 A | | 1/1993 | Jursich et al. |
| 5,478,046 A | | 12/1995 | Szabo |
| 5,630,628 A | | 5/1997 | Mönch |

(Continued)

OTHER PUBLICATIONS

Danco Shower Blaster, Danco, Inc., http://www.danco.com/files/multifile/ShowerBlaster-10074-Instructions.pdf, 2010.

(Continued)

*Primary Examiner* — Steven J Ganey
(74) *Attorney, Agent, or Firm* — Faegre Baker Daniels LLP

(57) ABSTRACT

A showerhead assembly includes an adapter having a tube extending between a proximal end and a distal end, the proximal end being supported by a shower arm. A fluid connector includes a ball having an outlet, a stem having an inlet, and a fluid passageway extending along a longitudinal axis between the inlet and the outlet. A spray engine is fluidly coupled to the ball of the fluid connector. A retainer body is supported by the stem of the fluid connector and includes a radially inwardly facing engagement surface. A collet is operably coupled to the retainer body and is configured to be concentrically received intermediate the adapter and retainer body. The collet includes a plurality of circumferentially spaced fingers supporting radially extending teeth configured to engage the adapter.

30 Claims, 14 Drawing Sheets

(56) References Cited

U.S. PATENT DOCUMENTS

| | | | |
|---|---|---|---|
| 5,634,624 A | 6/1997 | Lacroix | |
| 5,695,169 A | 12/1997 | Higgins et al. | |
| 5,788,160 A | 8/1998 | Woog | |
| 5,803,508 A | 9/1998 | Lowella | |
| 5,926,868 A | 7/1999 | Bjerke | |
| 5,997,047 A * | 12/1999 | Pimentel | B05B 15/067 239/587.3 |
| 6,183,022 B1 | 2/2001 | Guest | |
| 6,276,004 B1 | 8/2001 | Bertrand | |
| 6,315,220 B1 | 11/2001 | Grubb | |
| 6,378,912 B1 | 4/2002 | Condon et al. | |
| 6,398,128 B1 | 6/2002 | Hamilton et al. | |
| 6,415,461 B1 | 7/2002 | Singer | |
| 6,619,570 B1 * | 9/2003 | Ericksen | B05B 15/068 239/600 |
| 6,629,651 B1 * | 10/2003 | Male | B05B 15/066 239/587.1 |
| 6,672,628 B2 | 1/2004 | Thomas et al. | |
| 6,684,906 B2 | 2/2004 | Burns | |
| 7,124,453 B2 | 10/2006 | Sun | |
| 7,216,820 B2 | 5/2007 | Nelson et al. | |
| 7,270,350 B2 | 9/2007 | Cronley | |
| 7,325,706 B2 | 2/2008 | Sweeton et al. | |
| 7,533,906 B2 | 5/2009 | Luettgen et al. | |
| 7,549,680 B2 | 6/2009 | Gibbs | |
| 7,669,613 B2 | 3/2010 | Egli | |
| 7,871,020 B2 | 1/2011 | Nelson et al. | |
| 7,914,052 B1 | 3/2011 | Christianson | |
| 8,109,450 B2 | 2/2012 | Luettgen et al. | |
| 8,122,528 B2 | 2/2012 | Heisterhagen | |
| 8,132,745 B2 | 3/2012 | Leber et al. | |
| 8,413,686 B2 | 4/2013 | Ko | |
| 8,616,470 B2 | 12/2013 | Williams | |
| 2004/0217196 A1 | 11/2004 | Yurek et al. | |
| 2006/0226175 A1 | 10/2006 | Sledzieski | |
| 2006/0283336 A1 | 12/2006 | Eveleigh et al. | |
| 2008/0191102 A1 | 8/2008 | Condon et al. | |
| 2008/0217432 A1 | 9/2008 | Wu | |
| 2008/0290661 A1 | 11/2008 | O'Brien | |
| 2009/0039649 A1 | 2/2009 | Pan | |
| 2010/0163652 A1 | 7/2010 | Kajuch et al. | |
| 2010/0237611 A1 | 9/2010 | Hung | |
| 2010/0314869 A1 | 12/2010 | Kuo | |
| 2011/0006514 A1 | 1/2011 | Li et al. | |
| 2011/0089263 A1 | 4/2011 | Hughett et al. | |
| 2011/0163539 A1 | 7/2011 | Naor | |
| 2011/0272041 A1 | 11/2011 | Dharani | |
| 2013/0036547 A1 | 2/2013 | Sansum et al. | |
| 2013/0341905 A1 | 12/2013 | Lehmann et al. | |
| 2014/0076445 A1 | 3/2014 | Zhou et al. | |
| 2014/0151467 A1 | 6/2014 | Huffington et al. | |

OTHER PUBLICATIONS

EZShower Quick Connect, http://www.itlk.com/accessories.html, Sep. 13, 2013.

* cited by examiner

QUICK CONNECT SHOWERHEAD

BACKGROUND AND SUMMARY OF THE DISCLOSURE

The present invention relates generally to showerheads and, more particularly, to a showerhead assembly including a quick connect coupling for releasably coupling a showerhead to a shower arm.

Showerheads are known to be fluidly coupled to shower arms extending from a vertical wall. Typically, such showerheads are threadably secured to a respective shower arm to provide a fluid connection to hot and cold water supplies through a control valve. It is desired to provide a showerhead that facilitates quick removal from its associated shower arm so that it may be easily cleaned and/or replaced.

According to an illustrative embodiment of the present disclosure, a showerhead assembly includes an adapter having a tube extending between a proximal end and distal end, the proximal end being supported by a shower arm. A fluid connector includes a ball having an outlet, and a stem having an inlet. A fluid passageway extends along a longitudinal axis of the fluid connector between the inlet and the outlet. A spray engine is fluidly coupled to the outlet of the fluid connector. A retainer body is supported by the stem of the fluid connector and includes a radially inwardly facing engagement surface. A collet is operably coupled to the retainer body, and is configured to be concentrically received intermediate the adapter and the retainer body. The collet includes a plurality of circumferentially spaced fingers supporting radially extending teeth configured to engage the adapter. A cover concentrically receives the collet. Distal axial movement of the cover moves the collet relative to the retainer body from a first position to a second position. In the first position, the engagement surface of the retainer body radially restrains the fingers of the collet from moving radially outwardly. In the second position, a radial clearance is defined between the engagement surface of the retainer body and the fingers of the collet, thereby allowing the fingers to move radially outwardly.

According to another illustrative embodiment of the present disclosure, a showerhead assembly includes an adapter having a tube with a cylindrical sidewall extending between a proximal end and a distal end, the proximal end being supported by a shower arm. A groove is formed within the sidewall of the adapter, and a bleed hole extends within the sidewall proximate the distal end of the adapter. A fluid connector includes a ball having an outlet, and a stem having an inlet. A fluid passageway extends along a longitudinal axis of the fluid connector between the inlet and the outlet. A spray engine is fluidly coupled to the outlet of the fluid connector. A retainer body is supported by the stem of the fluid connector and includes a radially inwardly facing engagement surface. A collet is operably coupled to the retainer body, and is configured to be concentrically received intermediate the adapter and the retainer body. The collet includes a plurality of circumferentially spaced fingers supporting radially extending teeth configured to engage the adapter. A leak path is defined through the fluid passageway and the bleed hole of the adapter when the teeth of the collet engage the adapter distal of the groove.

According to a further illustrative embodiment of the present disclosure, a showerhead assembly includes an adapter having a tube with a cylindrical sidewall extending between a proximal end and a distal end, the proximal end being supported by a shower arm. A primary groove is formed within the sidewall of the adapter, and a secondary groove is formed within the sidewall of the adapter distal of the primary groove. A fluid connector includes a ball having an outlet, and a stem having an inlet. A fluid passageway extends along a longitudinal axis of the fluid connector between the inlet and the outlet. A spray engine is fluidly coupled to the outlet of the fluid connector. A retainer body is supported by the stem of the fluid connector and includes a radially inwardly facing engagement surface. A collet is operably coupled to the retainer body, and is configured to be concentrically received intermediate the adapter and the retainer body. The collet includes a plurality of circumferentially spaced fingers supporting radially extending teeth configured to engage the adapter.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

The present invention is best described with reference to the accompanying figures, in which.

DETAILED DESCRIPTION OF THE DRAWINGS

Figure 1:
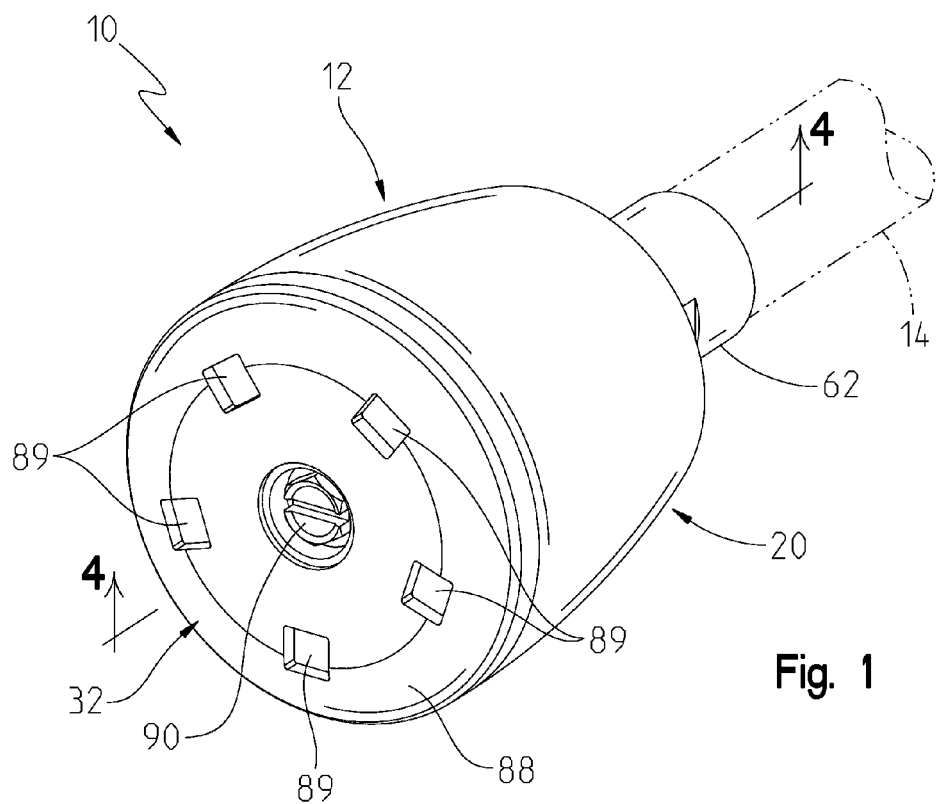
FIG. 1 is a front perspective view of an illustrative quick connect showerhead assembly of the present disclosure.
Figure 2:
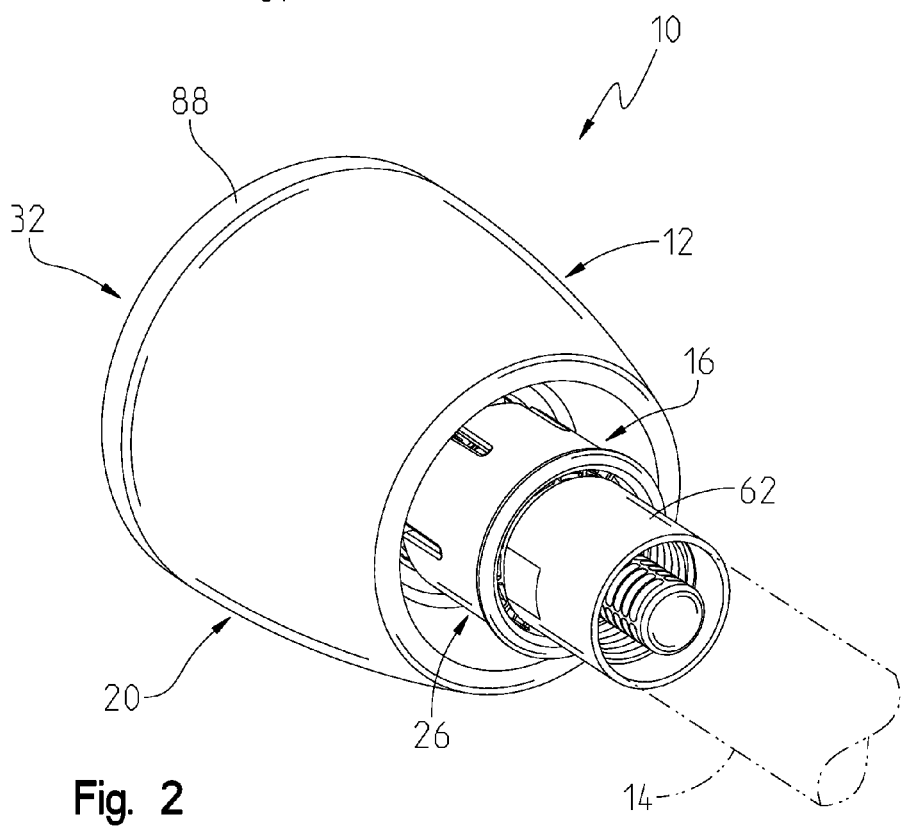
FIG. 2 is a rear perspective view of the illustrative quick connect showerhead assembly of FIG. 1.

The embodiments of the invention described herein are not intended to be exhaustive or to limit the invention to precise forms disclosed. Rather, the embodiments selected for description have been chosen to enable one skilled in the art to practice the invention.

With reference to FIGS. 1-4, a showerhead assembly 10 according to an illustrative embodiment of the present disclosure is shown as including a showerhead 12 releasably coupled to a shower arm 14 through a releasable or quick connect coupler 16. A fluid connector 18 supports a decorative shell 20 and is configured to be fluidly coupled to a shower arm adapter 22 supported by the shower arm 14. More particularly, the quick connect coupler 16 is configured to releasably couple the fluid connector 18 to the shower arm adapter 22 and thereby the shower arm 14.

The quick connect coupler 16 illustratively includes a collet 24, a cover 26 and a retainer body 28 positioned radially intermediate the collet 24 and the cover 26. The retainer body 28 is secured to a proximal or inlet end 30 of the fluid connector 18. A spray engine 32 is fluidly coupled to a distal or outlet end 34 of the fluid connector 18.

Figure 3:
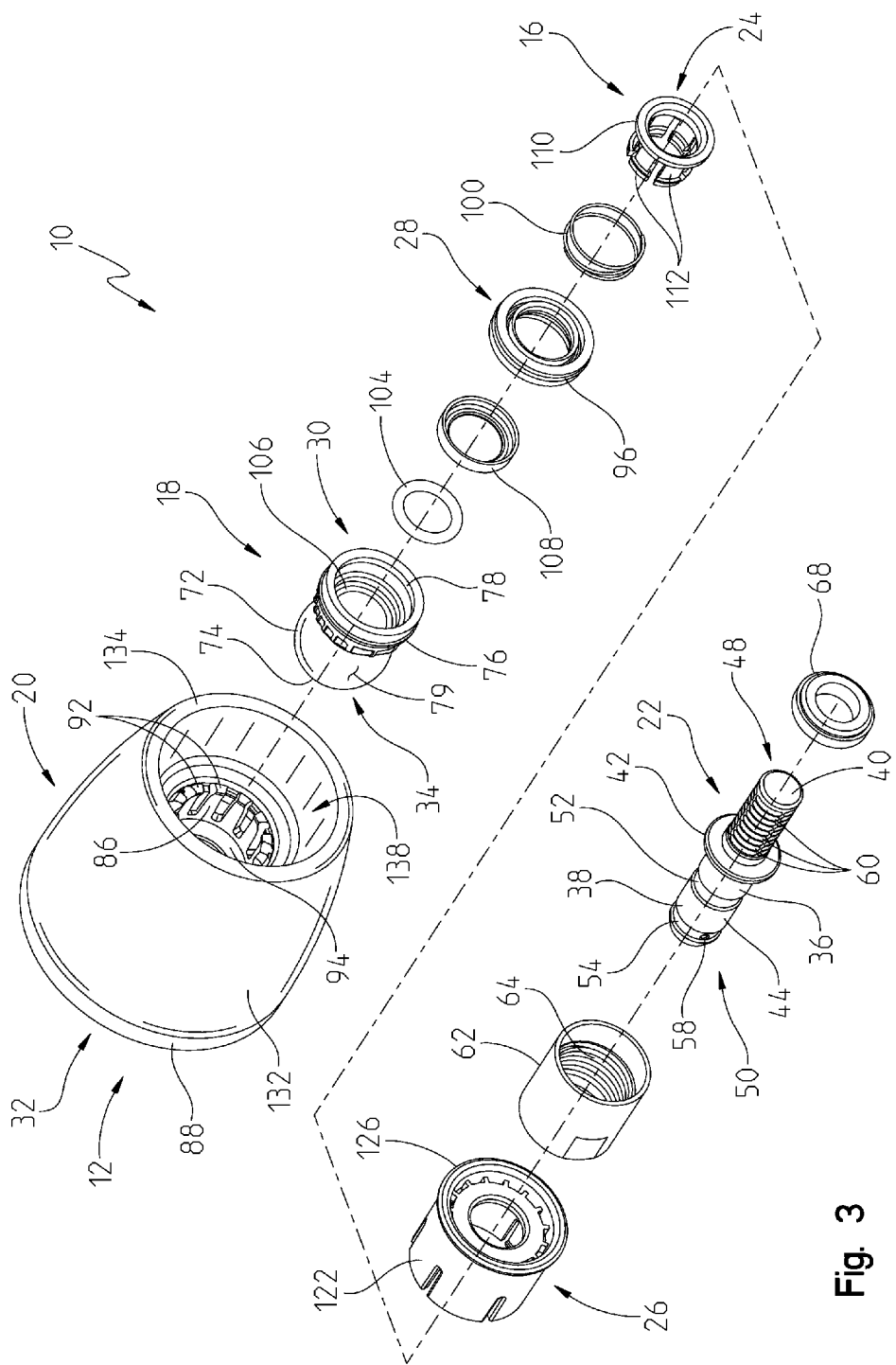
FIG. 3 is a rear exploded perspective view of the illustrative quick connect showerhead assembly of FIG. 1.
Figure 4:
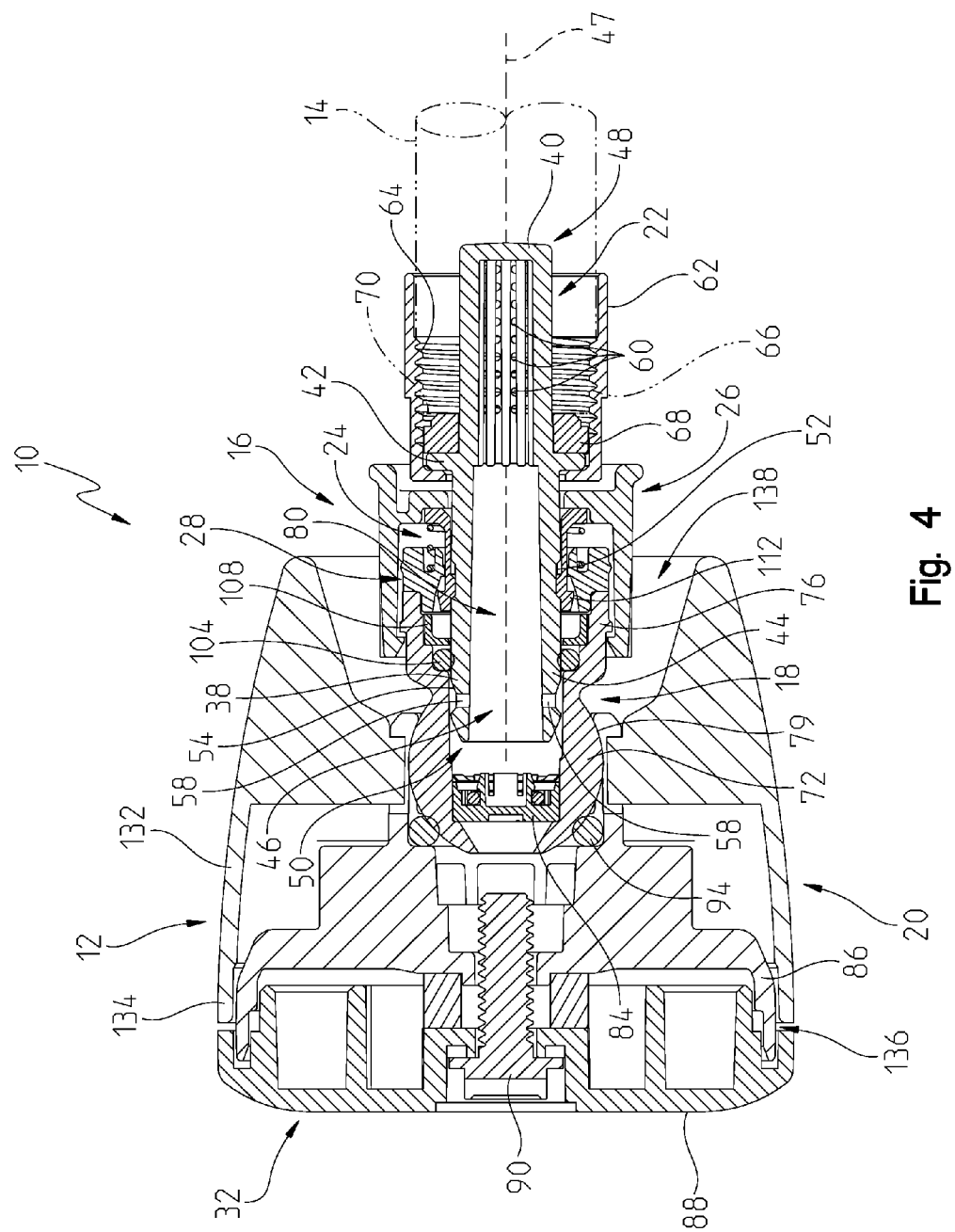
FIG. 4 is a cross-sectional view taken along line 4-4 of FIG. 1.

With reference to FIGS. 3-6, the shower arm adapter 22 illustratively includes a body 36 having a distal tube 38 and a proximal screen or filter 40. A seat, illustratively a flange 42, is positioned intermediate the tube 38 and the screen 40. A cylindrical sidewall 44 defines a fluid passageway 46 extending along a longitudinal axis 47 between a proximal end 48 and a distal end 50 of the body 36 (FIG. 4). A primary groove 52 and a secondary groove 54, axially spaced distally of the primary groove 52, are formed within an outer surface 56 of the sidewall 44. A pair of diametrically opposed bleed holes 58 are formed within the sidewall 44 proximate the distal end 50. The screen 40 illustratively includes a plurality of small dimensioned openings 60 configured to keep debris out of the fluid connector 18. Illustratively, the shower arm adapter 22 is molded from a polymer, such as an acetal copolymer, for example Celcon® M90 available from Celanese of Irving, Tex. Alternatively, the shower arm adapter 22 may be formed of a metal, such as stainless steel.

A retaining nut 62 illustratively secures the shower arm adapter 22 to the shower arm 14. More particularly, internal threads 64 of the retaining nut 62 engage with external threads 66 on the shower arm 14. The retaining nut 62 is illustratively formed of a polymer or a metal, such as brass. A seal 68, illustratively a stepped elastomeric gasket, seals the shower arm adapter 22 to the shower arm 14 (FIG. 4). More particularly, the seal 68 is axially compressed between the flange 42 and an outlet end 70 of the shower arm 14. In alternative embodiments, the adapter 22 may be secured to the shower arm 14 in various conventional manners, such as through brazing or adhesives. In yet other illustrative embodiments, the shower arm 14 may be integrally formed with the adapter 22, for example, through a swaging operation.

With further reference to FIGS. 3 and 4, the fluid connector 18 illustratively includes a ball 72 having an outlet 74 at the distal end 34, and a stem 76 having an inlet 78 at the proximal end 30. The ball 72 illustratively includes a semi-spherical outer surface 79. A fluid passageway 80 extends along longitudinal axis 47 between the inlet 78 and the outlet 74. Illustratively, the fluid connector 18 is formed from a metal or a polymer, such as an acetal copolymer, for example Celcon® M90.

A flow control device or regulator 84 may be supported by the ball 72 within the fluid passageway 80. The flow regulator 84 may be of conventional design, and illustratively limits flow to 2 gallons per minute (gpm). The flow regulator 84 may be secured to the fluid connector 18 by a metal retainer or an undercut molded into the ball 72. The proximal end 30 of the fluid connector 18 is coupled to the stem 76 of the retainer body 28, illustratively through ultrasonic welding, adhesives and/or fasteners (e.g., metal tabs). In alternative embodiments, the fluid connector 18 may be formed integrally with the retainer body 28 through molding.

The spray engine 32 may be of conventional design and illustratively includes a support 86 coupled to a faceplate 88 having a plurality of fluid outlets 89. In certain illustrative embodiments, the fluid outlets 89 may each include a fluid nozzle or a multi-dimensional fluidic device (not shown). Illustratively, the support 86 and the faceplate 88 may each be molded from a polymer, such as an acetal copolymer, for example Celcon® M90. The support 86 may be coupled to the faceplate 88 through conventional means, such as a fastener 90. In alternative embodiments, ultrasonic welding or adhesives may be substituted for the fastener 90. In yet other illustrative embodiments, the support 86 and the faceplate 88 may be integrally molded together.

The ball 72 of the fluid connector 18 is rotatably coupled to the support 86 of the spray engine 32. More particularly, a plurality of circumferentially spaced resilient fingers 92 axially retain the ball 72. The ball 72 is illustratively snap fit into the support 86 and is sealed against the spray engine 32 by a seal, such as an elastomeric o-ring 94.

Figure 5:
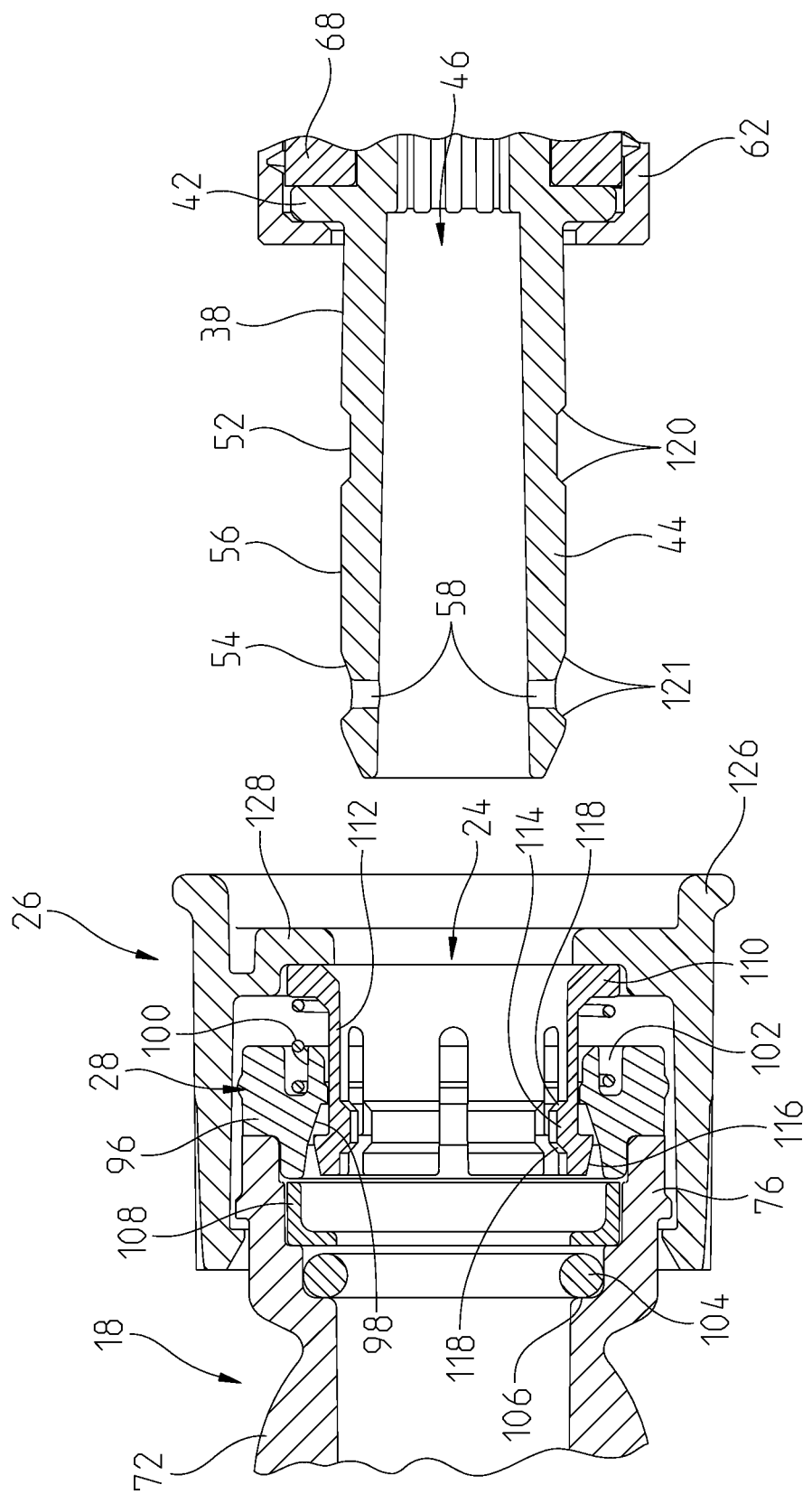
FIG. 5 is a detailed cross-sectional view of FIG. 4, showing the showerhead uncoupled from a shower arm adapter.
Figure 6:
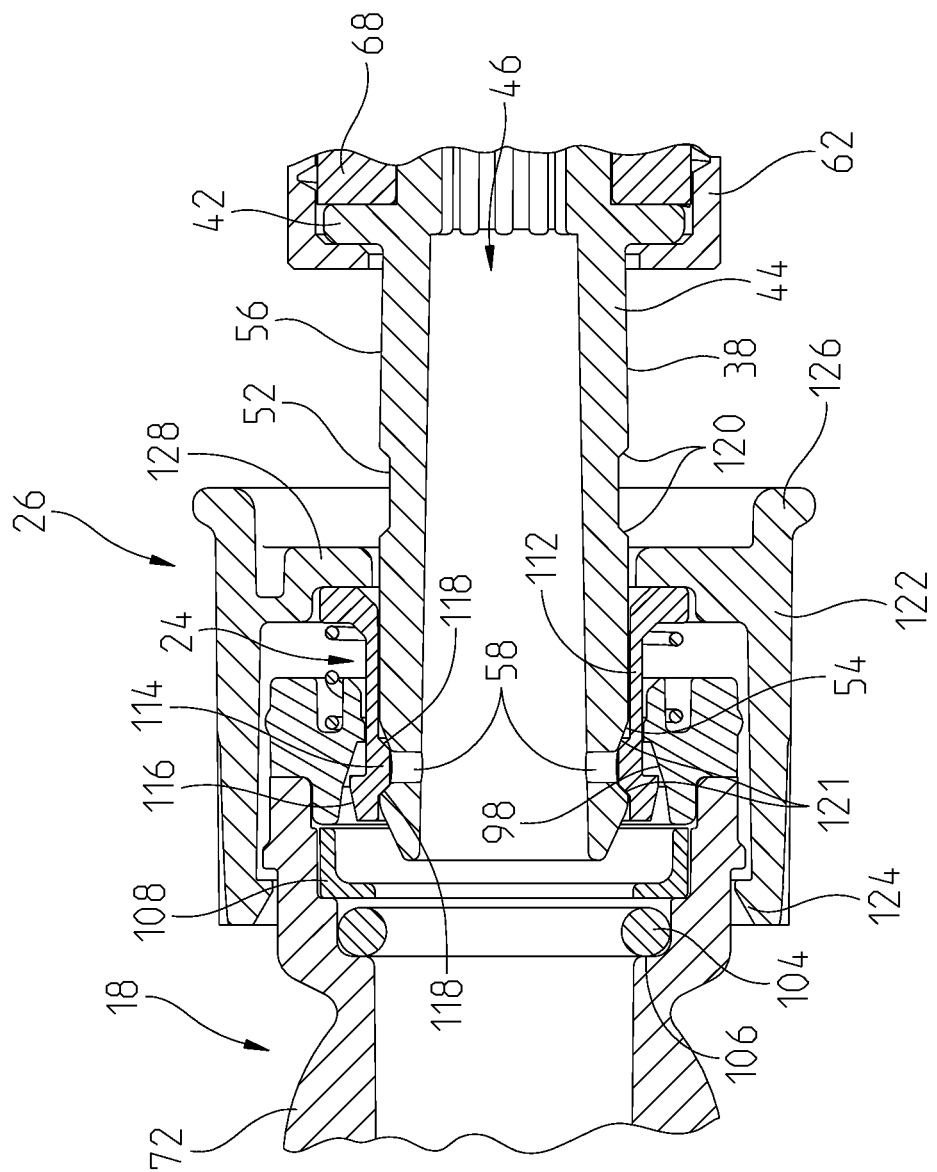
FIG. 6 is a detailed cross-sectional view of FIG. 4, showing retaining teeth of a collet of the showerhead received within a secondary groove of the shower arm adapter.

With reference to FIGS. 5 and 6, the retainer body 28 illustratively includes a cylindrical sidewall 96 supporting a radially inwardly facing engagement surface 98. The engagement surface 98 is angled or inclined radially outwardly as it extends axially in a distal direction. A spring 100 is supported within a pocket 102 defined within the proximal end of the retainer body 28.

A seal, illustratively an elastomeric o-ring 104, is received within a seat 106 defined by the stem 76 of the fluid connector 18. A spacer 108 is illustratively received within the stem 76 and engages the retainer body 28. The o-ring 104 is illustratively held against the seat 106 by the spacer 108 to prevent the o-ring 104 from moving axially in response to water pressure, thereby making the showerhead 12 easier to disengage from the shower arm adapter 22, and as such the shower arm 14.

Figure 13:
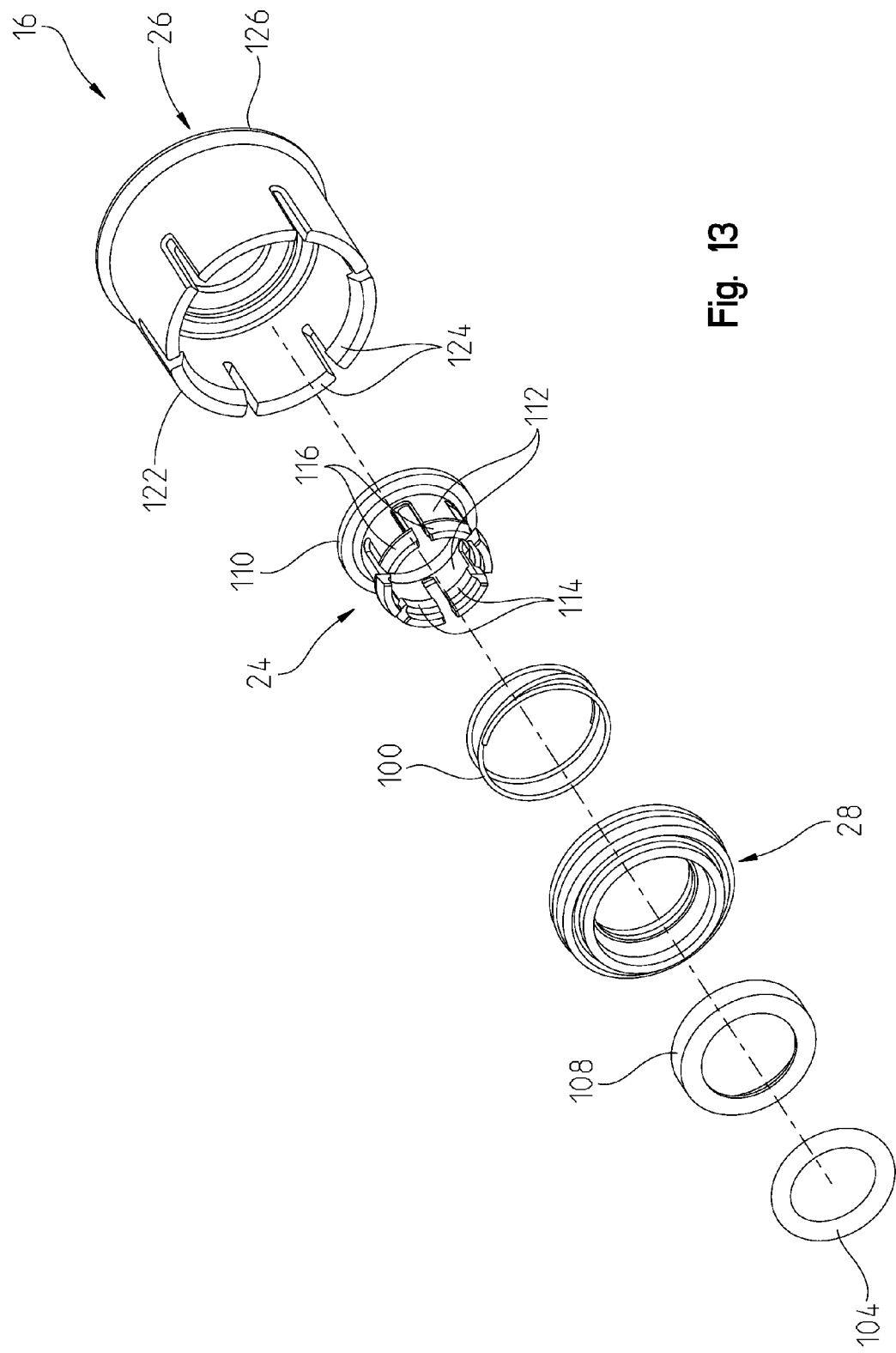
FIG. 13 is detailed front exploded perspective view of the showerhead assembly of FIG. 3.

With reference to FIGS. 5, 6 and 13, the collet 24 is operably coupled to the retainer body 28, and is configured to be concentrically received intermediate the adapter 22 and the retainer body 28. The collet 24 illustratively includes a collar 110 supporting a plurality of circumferentially spaced fingers 112. Each of the fingers 112 supports radially inwardly extending teeth 114 configured to engage the adapter 22. The grooves 52 and 54 of the adapter 22 are configured to accept the teeth 114. The interaction of the retainer body 28 and the collet fingers 112 ensure positive engagement between the teeth 114 and the groove 52, 54 when the system is pressurized. The secondary groove 54 is provided as a safety feature to prevent water pressure from forcing (e.g., propelling) the showerhead 12 off of the shower arm adapter 22 if the teeth 114 of the fingers 112 are not fully seated or engaged within the primary groove 52 (e.g., positioned intermediate the primary groove 52 and the secondary groove 54). Illustratively, the collar 110 and the fingers 112, including the teeth 114, are integrally molded from an acetal copolymer, for example Celcon® M90. Alternatively, the teeth 114 may be formed of different material than the fingers 112, such as a metal (e.g., stainless steel).

Figure 10:
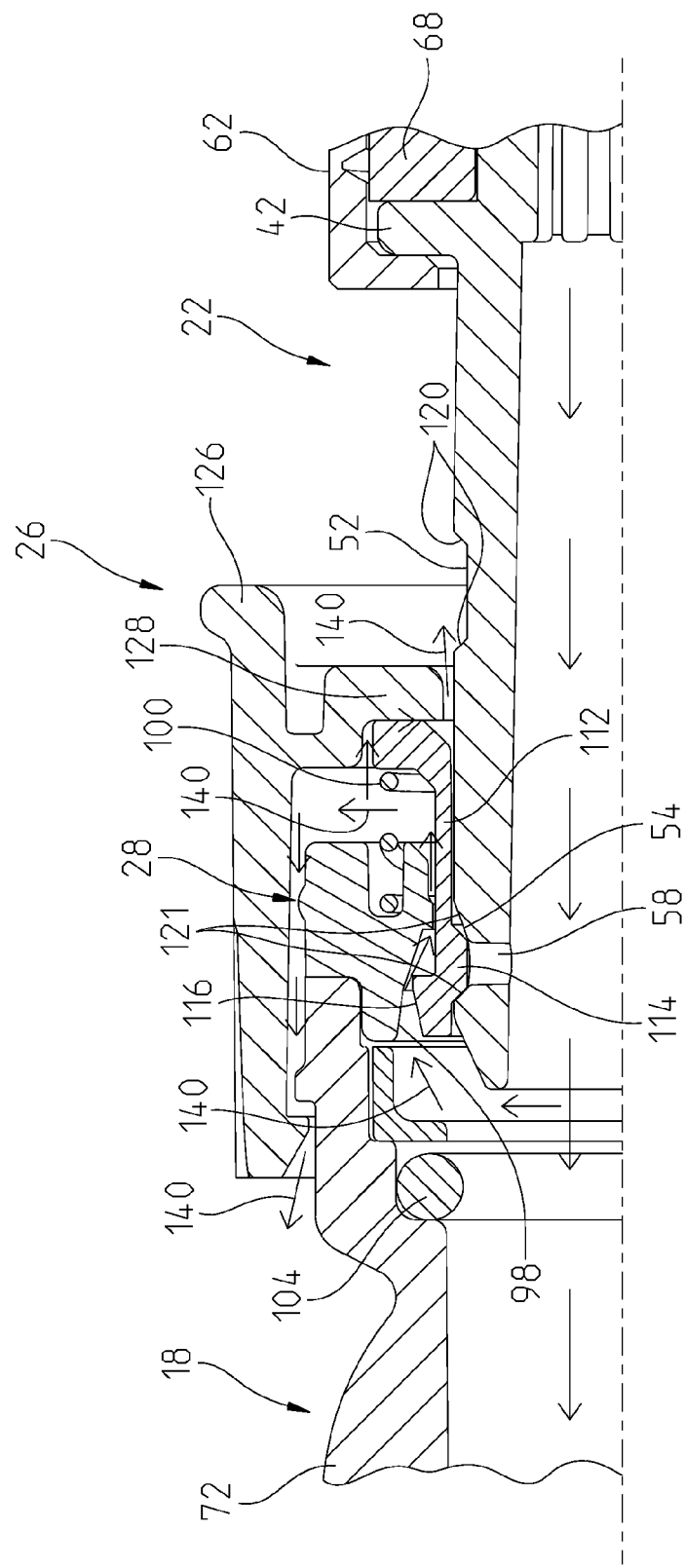
FIG. 10 is a further detailed cross-sectional view of FIG. 6, showing a first water leak flow path through a fluid passageway of the fluid connector, and between the collet and the cover.
Figure 11:
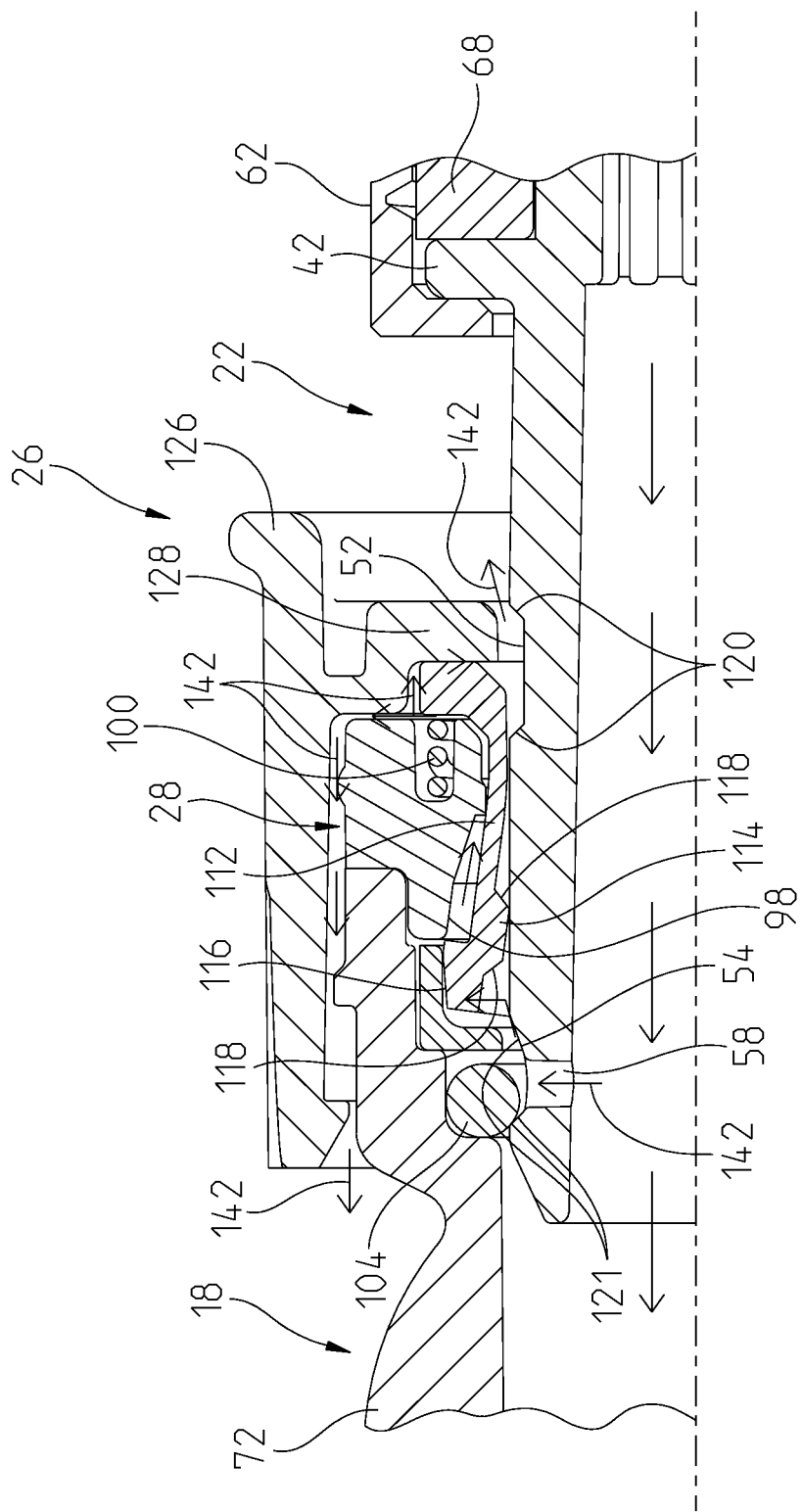
FIG. 11 is a further detailed cross-sectional view of FIG. 7, showing a second water leak flow path through the fluid passageway of the fluid connector, a bleed hole of the adapter, and between the collet and the cover.
Figure 12:
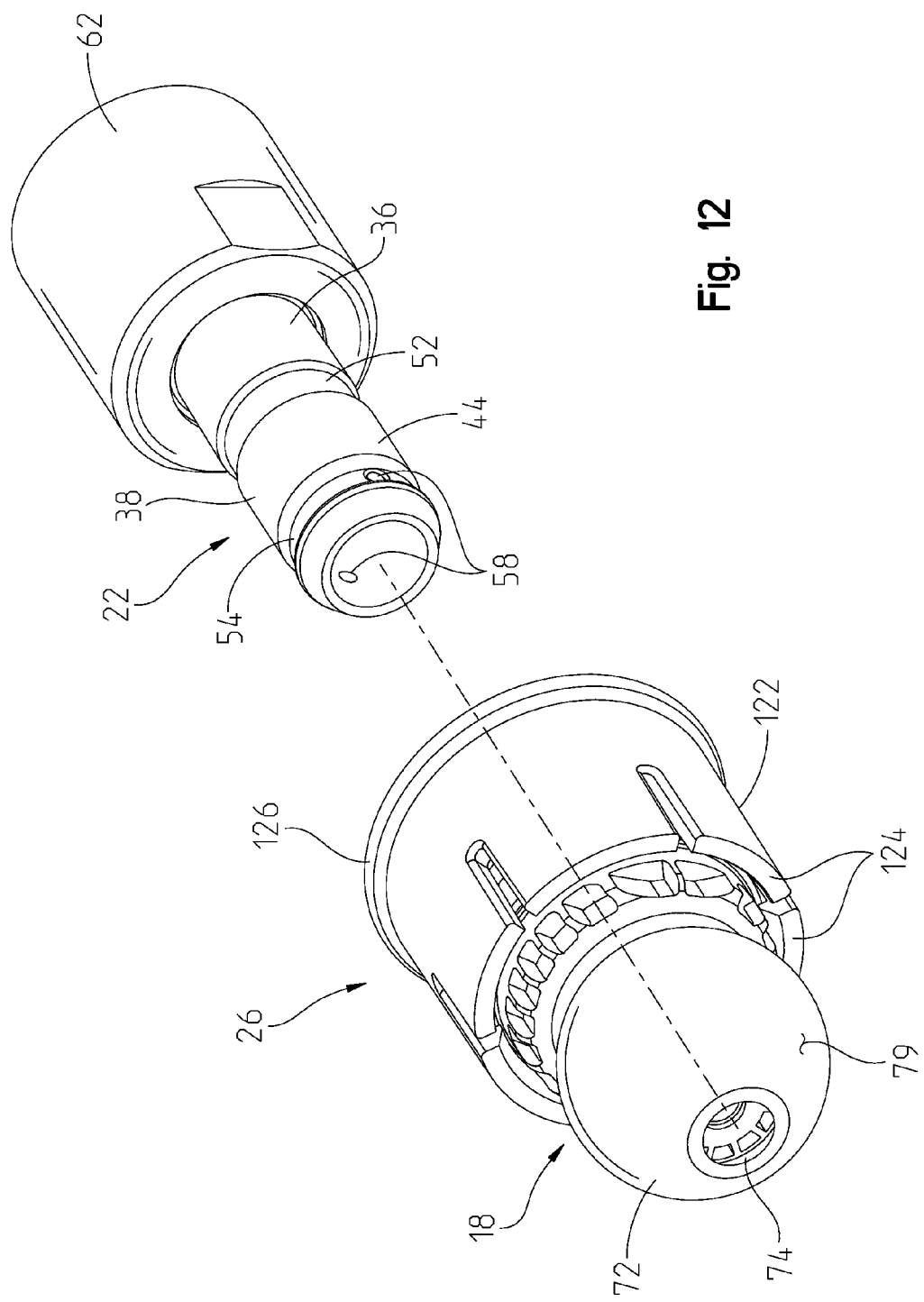
FIG. 12 is a partially exploded perspective view showing the fluid connector, the cover, the shower arm adapter, and the retaining nut of the showerhead assembly of FIG. 1.

With reference to FIGS. 5 and 6, a distal end of each finger 112 includes an angled engagement surface 116 configured to cooperate with the engagement surface 98 of the retainer body 28. The spring 100 extends between the retainer body 28 and the collet 24 to axially bias the retainer body 28 away from the collet 24 to prevent accidental disengagement. Teeth 114 illustratively include angled surfaces 118 configured to cooperate with angled surfaces 120 and 121 of grooves 52 and 54, respectively, in the adapter 22 (FIGS. 10 and 11).

As shown in FIGS. 5, 6, 12 and 13, the cover 26 concentrically receives the collet 24 and conceals the fluid connector 18 and the quick connect coupler 16. The cover 26 illustratively includes a cylindrical sidewall 122 and a plurality of circumferentially spaced snaps 124 that couple to the fluid connector 18. The cover 26 may be formed from a metal or a plated polymer, such as a metal plated acrylonitrile butadiene styrene (ABS).

Figure 8:
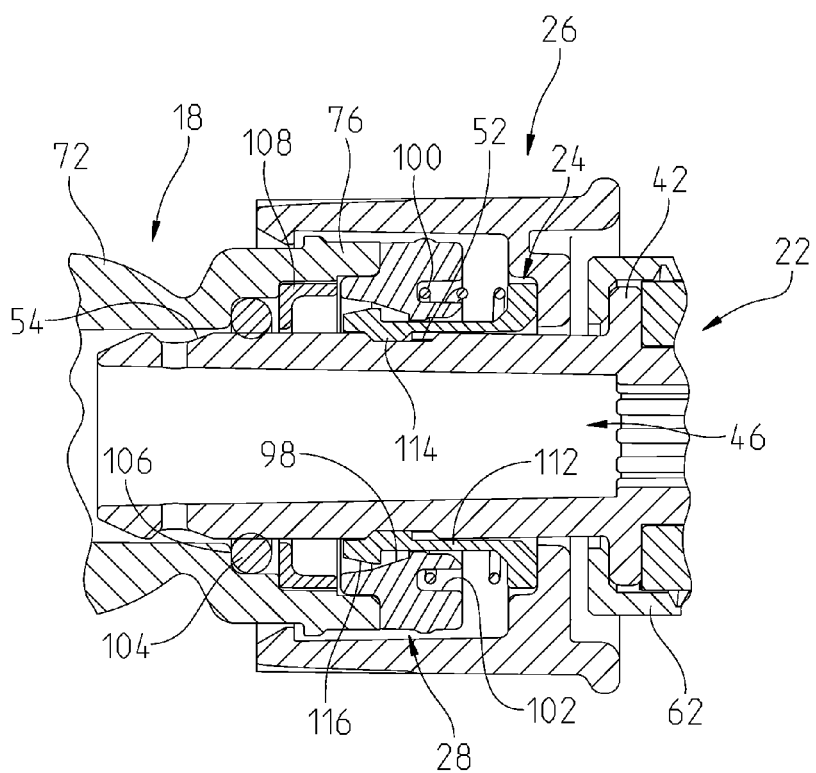
FIG. 8 is a detailed cross-sectional view of FIG. 4, showing the collet in a first or fully coupled position, where the retaining teeth of the collet are received within the primary groove of the shower arm adapter.
Figure 9:
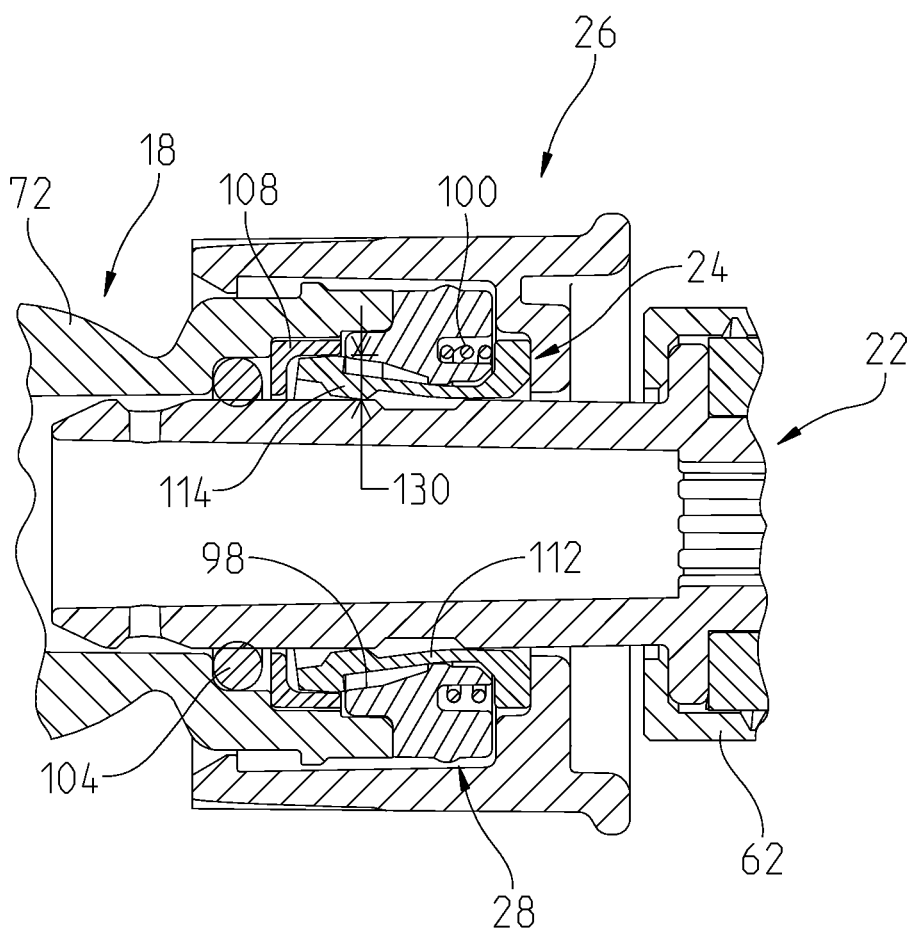
FIG. 9 is a detailed cross-sectional view similar to FIG. 8, showing the collet in a second or released position, axially distal of the first position, where the retaining teeth of the collet are received within a radial clearance defined between the retainer body and the shower arm adapter.

A flange or lip 126 extends radially outwardly from the sidewall 122 and is configured to be engaged by the fingers of a user. A ledge 128 is positioned radially inwardly from the sidewall 122 and is configured to axially engage the collet 24. Axial movement of the cover 26 causes the ledge 128 to distally move the collet 24 away from the retainer body 28 from a first position (FIG. 8) to a second position (FIG. 9). In the first position of FIG. 8, the engagement surface 98 of the retainer body 28 restrains the fingers 112 of the collet 24 from moving radially outwardly. In the second position of FIG. 9, the collet 24 is positioned axially distal of the first position of FIG. 8, and the retaining teeth 114 of the collet 24 are received within a radial clearance 130 defined between the retainer body 28 and the shower arm adapter 22. As such, the teeth 114 of the collet 24 are positioned radially external to the grooves 52, 54.

With further reference to FIGS. 3 and 4, the decorative shell 20 receives the fluid connector 18. The shell 20 may include a body 132 having a wall 134 defining a distal recess 136 supporting the spray engine 32, and a proximal recess 138 that partially conceals the cover 26. The shell 20 may be formed from a metal or a plated polymer, such as a metal plated acrylonitrile butadiene styrene (ABS). Conventional couplers, such as fasteners (e.g., snaps), ultrasonic welding or adhesives, may be used to secure the shell 20 to the spray engine 32.

Figure 7:
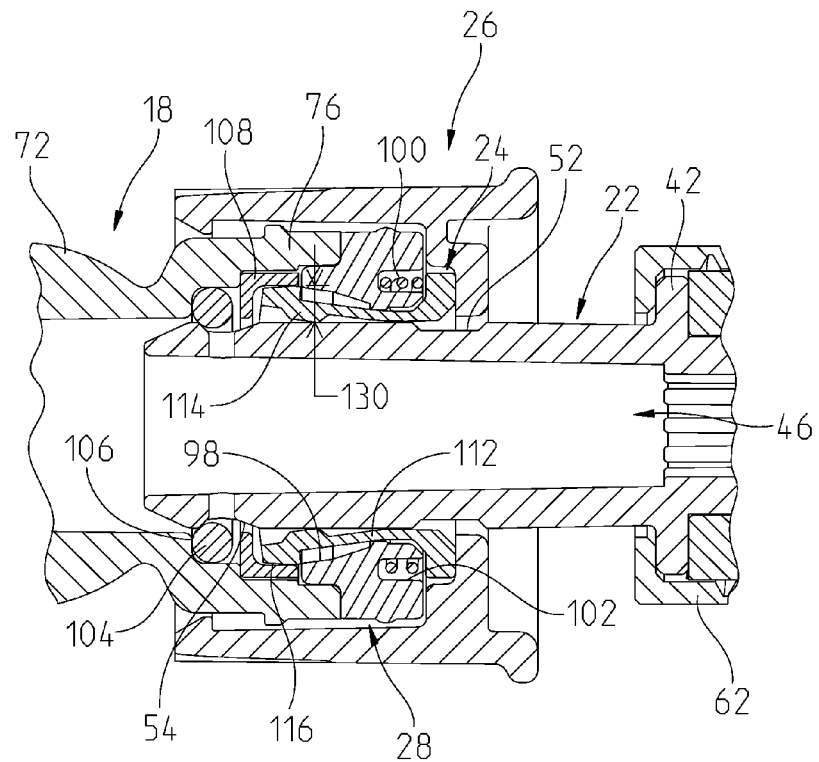
FIG. 7 is a detailed cross-sectional view of FIG. 4, showing retaining teeth of the collet of the showerhead engaging the shower arm adapter intermediate the secondary groove and a primary groove of the shower arm adapter.

In operation, the shower arm adapter 22 extends within the collet 24 and is gripped by the teeth 114 of the fingers 112. As shown in FIGS. 5 and 6, the showerhead 12 is axially moved such that the shower arm adapter 22 is received within the collet 24. The fingers 112 of the collet 24 flex radially outwardly over the distal end of the shower arm adapter 22. In FIG. 6, the teeth 114 are shown received within the secondary groove 54 of the shower arm adapter 22. With reference to FIG. 7, continued axial movement of the showerhead 12 causes the fingers 112 to again flex radially outwardly over the outer surface of the shower arm adapter 22 intermediate the secondary groove 54 and the primary groove 52. As shown in FIG. 8, continued axial movement of the showerhead 12 relative to the shower arm adapter 22 results in the teeth 114 being received within the primary groove 52, thereby fully coupling or securing the showerhead 12 to the shower arm adapter 22. An audible and tactile confirmation of full coupling may be created when the teeth 114 snap into the primary groove 52.

The o-ring 104 illustratively seals the shower arm adapter 22 to the ball 72 of the fluid connector 18. When pressurized, the pulling force that tends to separate the adapter 22 from the fluid connector 18 serves to increase the gripping force of the collet 24. This is due to the angled engagement surface 98 on the retainer body 28 interacting with the collet 24 as this forces the teeth 114 of the collet 24 into the adapter 22. The adapter 22 is illustratively not visible to the user when assembled, as the flange 126 of the cover 26 is slightly above the lowest surface of the retaining nut 62.

With reference to FIG. 9, the user removes the showerhead 12 from the adapter 22 by pulling down on the flange 126 of the cover 26 toward the showerhead 12. This causes the ledge 128 of the cover 26 to push the top of the collet 24 down and removes the gripping force of the collet 24 on the adapter 22. The showerhead 12 can then be axially pulled off of the adapter 22 and the shower arm 14.

FIG. 10 is a further detailed cross-sectional view of the showerhead assembly 10 similar to FIG. 6, showing the retaining teeth 114 of the collet 24 received within the secondary groove 54 of the shower arm adapter 22. In such a position, a first water leak flow path (represented by arrows 140) is defined through the fluid passageway 80 of the fluid connector 18, and between the collet 24 and the cover 26.

FIG. 11 is a further detailed cross-sectional view of the showerhead assembly 10 similar to FIG. 7, showing the retaining teeth 114 of the collet 24 engaging the outer surface of the shower arm adapter 22 intermediate the secondary groove 54 and the primary groove 52. In such a position, a second water leak flow path (represented by arrows 142) is defined through the fluid passageway 80 of the fluid connector 18, the bleed holes 58 of the adapter 22, and between the collet 24 and the cover 26.

As shown in FIGS. 10 and 11, if the showerhead 12 is not fully coupled (i.e., teeth 114 of the fingers 112 are not received within the primary groove 52), water will leak from around the showerhead 12 thereby providing an indication to the user.

The showerhead assembly 10 of the present invention allows homeowners to quickly remove the showerhead 12 from the shower arm 14 for cleaning and/or replacement. It should be appreciated that various attachments can be connected to the shower arm adapter 22 when the showerhead 12 is removed. Such attachments can be of the type connected to a conventional hose (such as hand showers and pet washers), and would have the same quick connect coupling components as in the showerhead 12.

Figure 14:
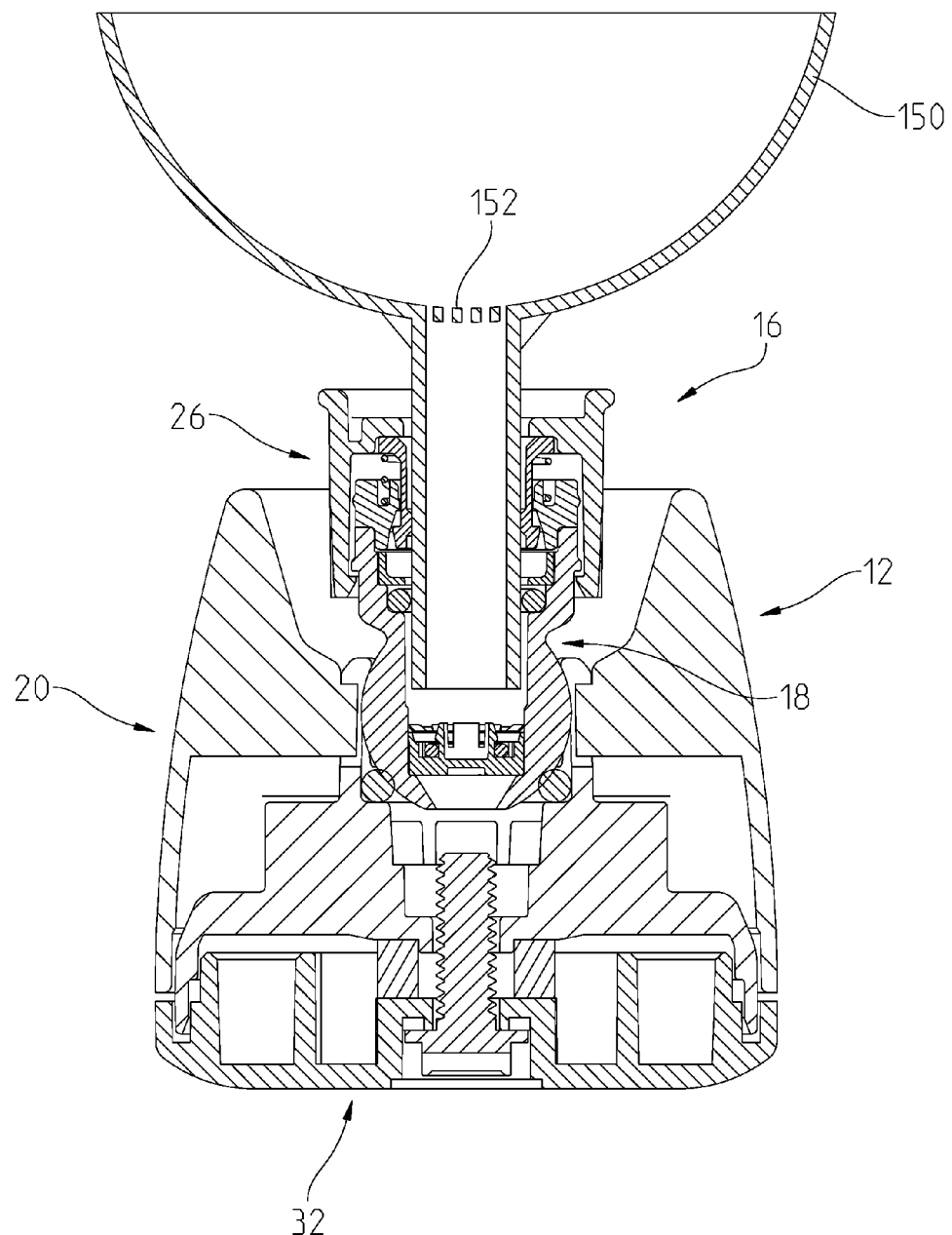
FIG. 14 is a cross-sectional view similar to FIG. 4, showing a funnel substituted for the shower arm adapter.

FIG. 14 illustrates the showerhead 12 removed from the shower arm 14 for the purposes of cleaning, for example, in a dishwasher (not shown). Illustratively, a funnel 150 is placed into the fluid connector 18 and releasably attaches using the quick connect coupler 16. The funnel 150 is configured to direct water through the showerhead 12 for internal cleaning. Illustratively, the funnel 150 includes a molded screen or filter 152 to keep debris out of the showerhead 12.

Figure 15:
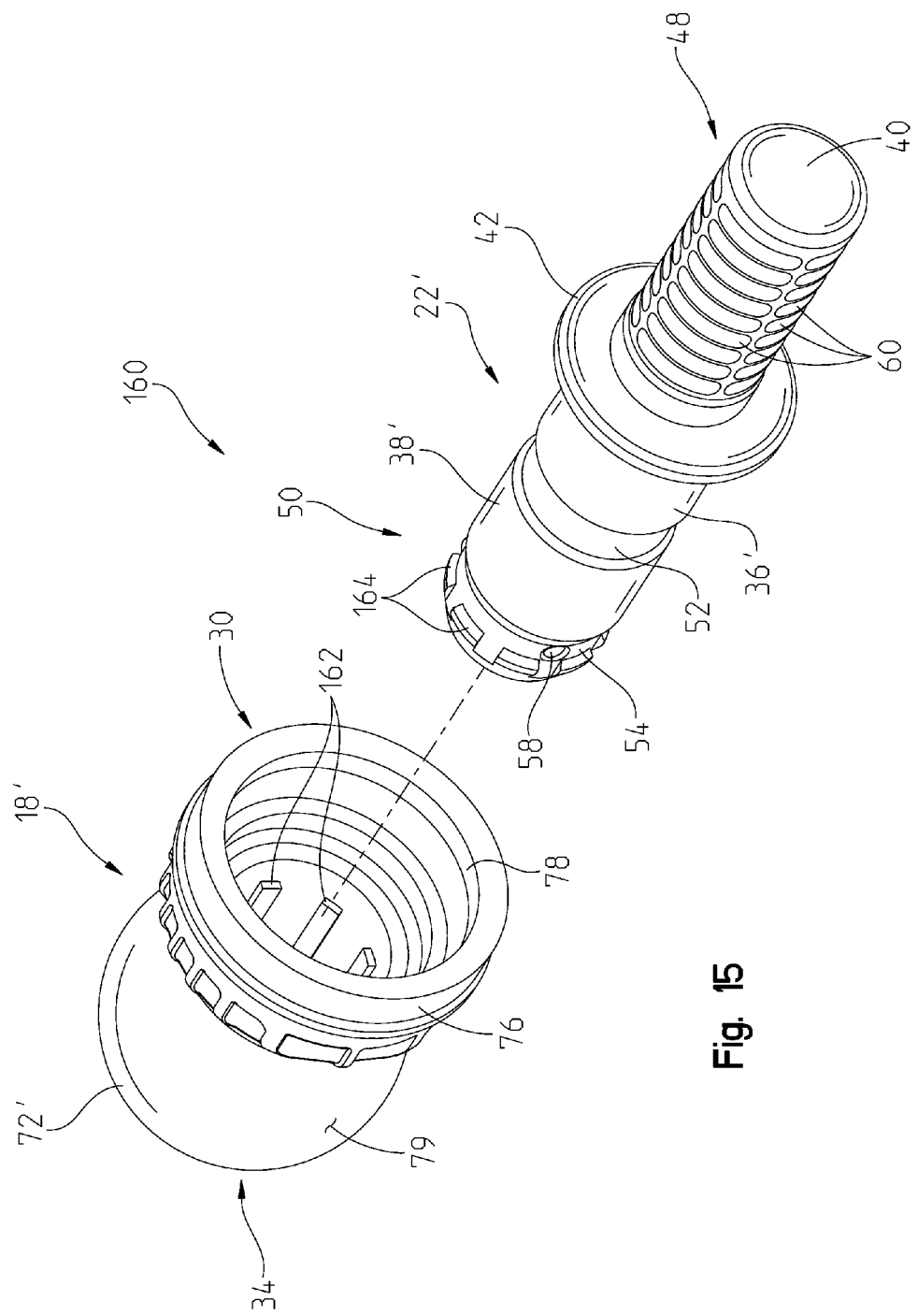
FIG. 15 is a partially exploded perspective view showing a rotational lock supported by the fluid connector and the shower arm adapter of an illustrative quick connect showerhead assembly.
Figure 16:
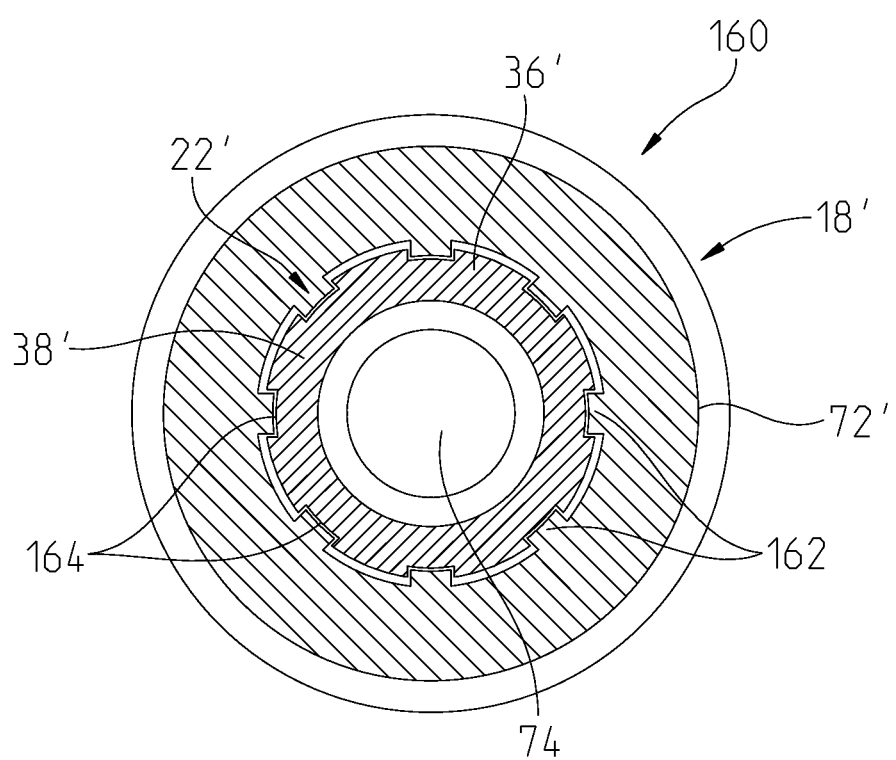
FIG. 16 is a cross-sectional view of the rotational lock of FIG. 15.

With reference now to FIGS. 15 and 16, a rotational lock 160 is shown as supported by further illustrative fluid connector 18' and shower arm adapter 22'. The rotational lock 160 provides for rotational orientation and retention of the fluid connector 18' relative to the shower arm 22'. More particularly, the rotational lock 160 resists rotation of the ball 72' of the fluid connector 18' relative to the tube 38' of the adapter 22', so as to operate valving, such as a diverter valve (not shown) to change spray patterns discharged from the spray engine 32 within the showerhead 12. More particularly, rotation of the shell 20 of the showerhead 12 relative to the ball 72' of the fluid connector 18' and the tube 38' of the shower arm adapter 22' may toggle between different spray patterns discharged from the spray engine 32 (such as stream, spray, and/or pulsating patterns).

The illustrative rotational lock 160 includes a plurality of circumferentially spaced ribs or protrusions 162 extending radially inwardly from an inner surface of the ball 72', and a plurality of circumferentially spaced slots or recesses 164 extending radially inwardly from the outer surface of the body 36' at the distal end 50 of the tube 38'. The ribs 162 are illustratively received within the slots 164 to define the rotational lock 160 and prevent relative rotation between the fluid connector 18' and the shower arm adapter 22'.

Although the invention has been described in detail with reference to certain preferred embodiments, variations and modifications exist within the spirit and scope of the invention as described and defined in the following claims.

The invention claimed is:

1. A showerhead assembly comprising:
an adapter including a tube extending between a proximal end and a distal end, the proximal end being supported by a shower arm;
a fluid connector including a ball having an outlet, and a stem having an inlet, a fluid passageway extending along a longitudinal axis between the inlet and the outlet;
a spray engine fluidly coupled to the outlet of the fluid connector;
a retainer body supported by the stem of the fluid connector and including a radially inwardly facing engagement surface;
a collet operably coupled to the retainer body and configured to be concentrically received intermediate the adapter and the retainer body, the collet including a plurality of circumferentially spaced fingers supporting radially extending teeth to engage the adapter;
a cover concentrically receiving the collet; and
wherein distal axial movement of the cover moves the collet relative to the retainer body from a first position to a second position, in the first position the engagement surface of the retainer body radially restraining the fingers of the collet from moving radially outwardly, and in the second position a radial clearance defined between the engagement surface of the retainer body and the fingers of the collet, thereby allowing the fingers to move radially outwardly.

2. The showerhead assembly of claim 1, further comprising a spring biasing the collet in a proximal direction toward the first position.

3. The showerhead assembly of claim 1, further comprising a primary groove supported on the adapter, and a secondary groove supported on the adapter distal of the primary groove.

4. The showerhead assembly of claim 3, further comprising a bleed hole supported proximate the distal end of the adapter, a leak path defined through the bleed hole when the teeth are positioned intermediate the primary groove and the secondary groove.

5. The showerhead assembly of claim 3, further comprising an o-ring concentrically received within the stem of the fluid connector and configured to provide a seal between the fluid connector and the adapter.

6. The showerhead assembly of claim 1, an outer shell coupled to the spray engine, the outer shell including a side wall extending between an inlet end and an outlet end.

7. The showerhead assembly of claim 1, wherein each of the fingers of the collet includes a radially outwardly facing angled leading edge, and each of the teeth of the fingers extend radially inwardly proximal of the leading edge.

8. The showerhead assembly of claim 1, wherein the cover includes a cylindrical sidewall and a ledge positioned radially inwardly from the sidewall, the ledge configured to axially engage the collet.

9. The showerhead assembly of claim 1, wherein the spray engine includes a body and a sprayface coupled to the body, the sprayface including a plurality of outlets for dispensing water.

10. The showerhead assembly of claim 1, further comprising a rotational lock supported intermediate the adapter and the fluid connector, the rotational lock configured to resist rotation between the tube of the adapter and the ball of the fluid connector.

11. A showerhead assembly comprising:
an adapter including a tube having a cylindrical sidewall extending between a proximal end and a distal end, the proximal end being supported by a shower arm, a groove formed within the sidewall, and a bleed hole extending within the sidewall proximate the distal end;
a fluid connector including a ball having an outlet and a stem having an inlet, a fluid passageway extending along a longitudinal axis between the inlet and the outlet;
a spray engine fluidly coupled to the outlet of the fluid connector;
a retainer body supported by the stem of the fluid connector and including a radially inwardly facing engagement surface;
a collet operably coupled to the retainer body and configured to be concentrically received intermediate the adapter and the retainer body, the collet including a plurality of circumferentially spaced fingers supporting radially extending teeth to engage the adapter; and
a leak path defined through the fluid passageway and the bleed hole of the adapter when the teeth of the collet engage the adapter distal of the groove.

12. The showerhead assembly of claim 11, further comprising a cover concentrically receiving the collet, wherein axial movement of the cover distally moves the collet away from the retainer body from a first position to a second positon, in the first position the engagement surface of the retainer body radially restraining the fingers from moving radially outwardly, and in the second position a radial clearance defined between the engagement surface of the retainer body and the collet allowing the fingers to move radially outwardly.

13. The showerhead assembly of claim 12, further comprising a spring biasing the collet in a proximal direction toward the first position.

14. The showerhead assembly of claim 12, wherein the cover includes a cylindrical sidewall and a ledge positioned radially inwardly from the sidewall, the ledge configured to axially engage the collet.

15. The showerhead assembly of claim 11, further comprising an o-ring concentrically received within the stem of the fluid connector and configured to provide a seal between the fluid connector and the adapter.

16. The showerhead assembly of claim 11, an outer shell coupled to the spray engine, the outer shell including a side wall extending between an inlet end and an outlet end.

17. The showerhead assembly of claim 11, wherein each of the fingers of the collet includes a radially outwardly facing angled leading edge, and each of the teeth of the fingers extend radially inwardly proximal of the leading edge.

18. The showerhead assembly of claim 11, wherein the spray engine includes a body and a sprayface coupled to the body, the sprayface including a plurality of outlets for dispensing water.

19. The showerhead assembly of claim 11, wherein the groove includes a primary groove formed within the sidewall of the adapter, and a secondary groove formed within the sidewall of the adapter distal of the primary groove.

20. The showerhead assembly of claim 11, further comprising a rotational lock supported intermediate the adapter and the fluid connector, the rotational lock configured to resist rotation between the tube of the adapter and the ball of the fluid connector.

21. A showerhead assembly comprising:
   an adapter including a tube having a cylindrical sidewall extending between a proximal end and a distal end, the proximal end being supported by a shower arm, a primary groove formed within the sidewall, and a secondary groove formed within the sidewall distal of the primary groove;
   a fluid connector including a ball having an outlet and a stem having an inlet, a fluid passageway extending along a longitudinal axis between the inlet and the outlet;
   a spray engine fluidly coupled to the outlet of the fluid connector;
   a retainer body supported by the stem of the fluid connector and including a radially inwardly facing engagement surface; and
   a collet operably coupled to the retainer body and configured to be concentrically received intermediate the adapter and retainer body, the collet including a plurality of circumferentially spaced fingers supporting radially extending teeth configured to engage the adapter.

22. The showerhead assembly of claim 21, further comprising a cover concentrically receiving the collet, wherein axial movement of the cover distally moves the collet away from the retainer body from a first position to a second positon, in the first position the engagement surface of the retainer body radially restraining the fingers from moving radially outwardly, and in the second position a radial clearance defined between the engagement surface of the retainer body and the collet allowing the fingers to move radially outwardly.

23. The showerhead assembly of claim 22, further comprising a spring biasing the collet in a proximal direction toward the first position.

24. The showerhead assembly of claim 21, further comprising an o-ring concentrically received within the stem of the fluid connector and configured to provide a seal between the fluid connector and the adapter.

25. The showerhead assembly of claim 21, an outer shell coupled to the spray engine, the outer shell including a side wall extending between an inlet end and an outlet end.

26. The showerhead assembly of claim 21, wherein each of the fingers of the collet includes a radially outwardly facing angled leading edge, and each of the teeth of the fingers extend radially inwardly proximal of the leading edge.

27. The showerhead assembly of claim 21, wherein the cover includes a cylindrical sidewall and a ledge positioned radially inwardly from the sidewall, the ledge configured to axially engage the collet.

28. The showerhead assembly of claim 21, wherein the spray engine includes a body and a sprayface coupled to the body, the sprayface including a plurality of outlets for dispensing water.

29. The showerhead assembly of claim 21, further comprising a bleed hole supported proximate the distal end of the adapter, a leak path defined through the bleed hole when the teeth are positioned intermediate the primary groove and the secondary groove.

30. The showerhead assembly of claim 21, further comprising a rotational lock supported intermediate the adapter and the fluid connector, the rotational lock configured to resist rotation between the tube of the adapter and the ball of the fluid connector.

* * * * *